United States Patent [19]

Olson et al.

[11] Patent Number: 5,415,463

[45] Date of Patent: * May 16, 1995

[54] INJECTION MOLDED PLASTIC BICYCLE WHEEL

[76] Inventors: P. Douglas Olson, 33 Linden Grove, Aliso Viejo, Calif. 92656; Kirk G. Jones, 1805 Via Allena, Oceanside, Calif. 92056

[*] Notice: The portion of the term of this patent subsequent to Feb. 9, 2010 has been disclaimed.

[21] Appl. No.: 103,536

[22] Filed: Aug. 9, 1993

[51] Int. Cl.⁶ .............................. B60B 5/02
[52] U.S. Cl. .................. 301/64.7; 301/104; 301/110.5
[58] Field of Search .............. 301/64.7, 95, 96, 97, 301/98, 104, 110.5

[56] References Cited

U.S. PATENT DOCUMENTS

| | | | |
|---|---|---|---|
| 4,930,843 | 6/1990 | Lewis | 301/64.7 |
| 4,983,430 | 1/1991 | Sargent | 301/64.7 X |
| 4,995,675 | 2/1991 | Tsai | 301/64.7 |
| 5,080,444 | 1/1992 | Hopkins et al. | 301/64.7 X |
| 5,184,874 | 2/1993 | Olson et al. | 301/64.7 |
| 5,246,275 | 9/1993 | Arredondo, Jr. | 301/64.7 |
| 5,249,846 | 10/1993 | Martin et al. | 301/64.7 |

*Primary Examiner*—Russell D. Stormer
*Attorney, Agent, or Firm*—Plante & Strauss

[57] ABSTRACT

There is disclosed a hollow-form bicycle wheel formed by injection molding of plastic. The wheel has an integral, central sleeve to receive a wheel hub assembly, at least three, hollow-form, integral spokes that are symmetrically located at equal angular spacings about the hub, and an integrally formed peripheral annulus which is jointed to an independently formed annular rim having a peripheral channel to receive a tire. Preferably the rim is assembled to the mandrel of the wheel and the subassembly of rim and mandrel is placed in the mold cavity used for injection molding of the wheel, thereby bonding the rim to the wheel during its formation.

11 Claims, 3 Drawing Sheets

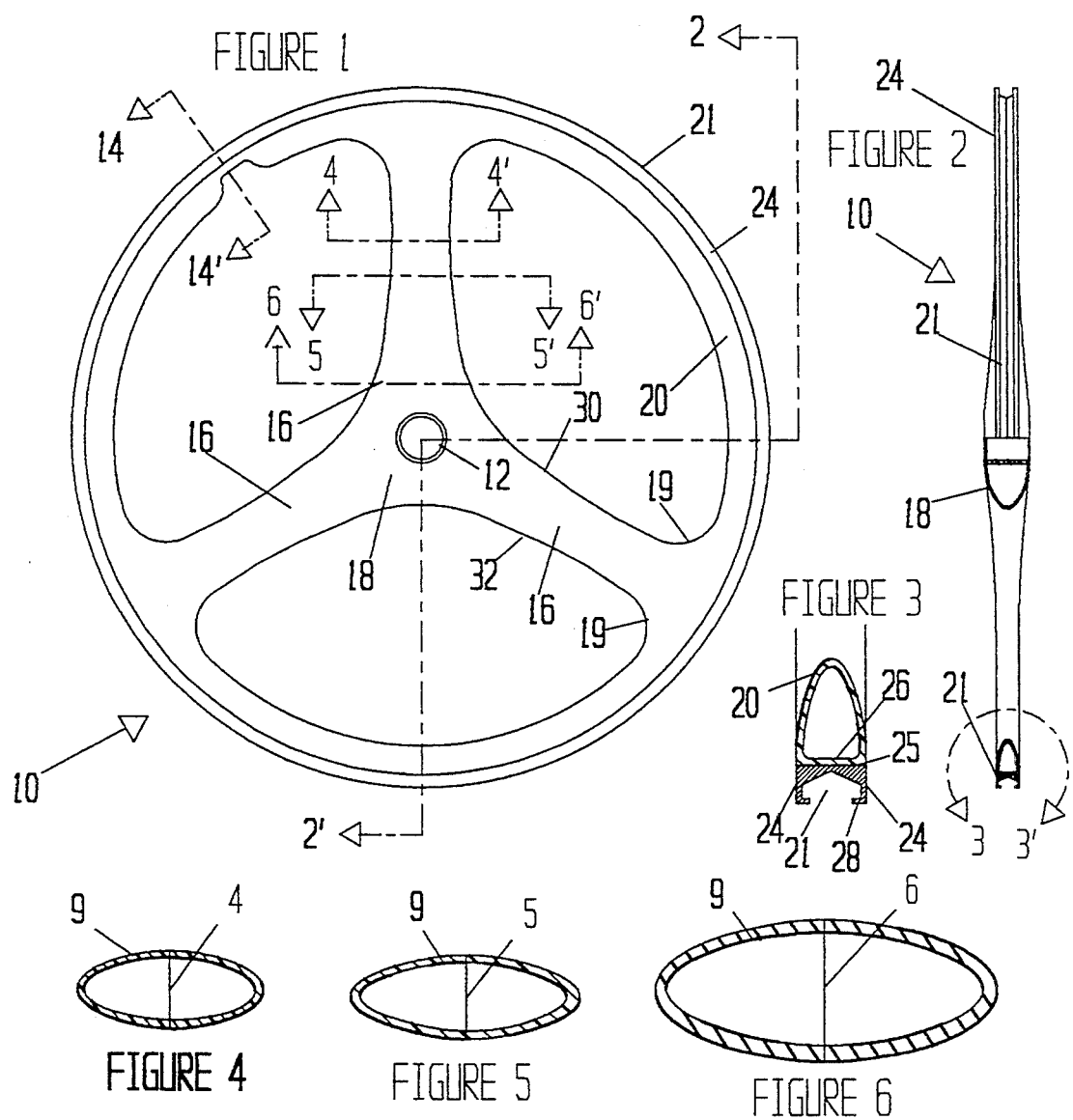

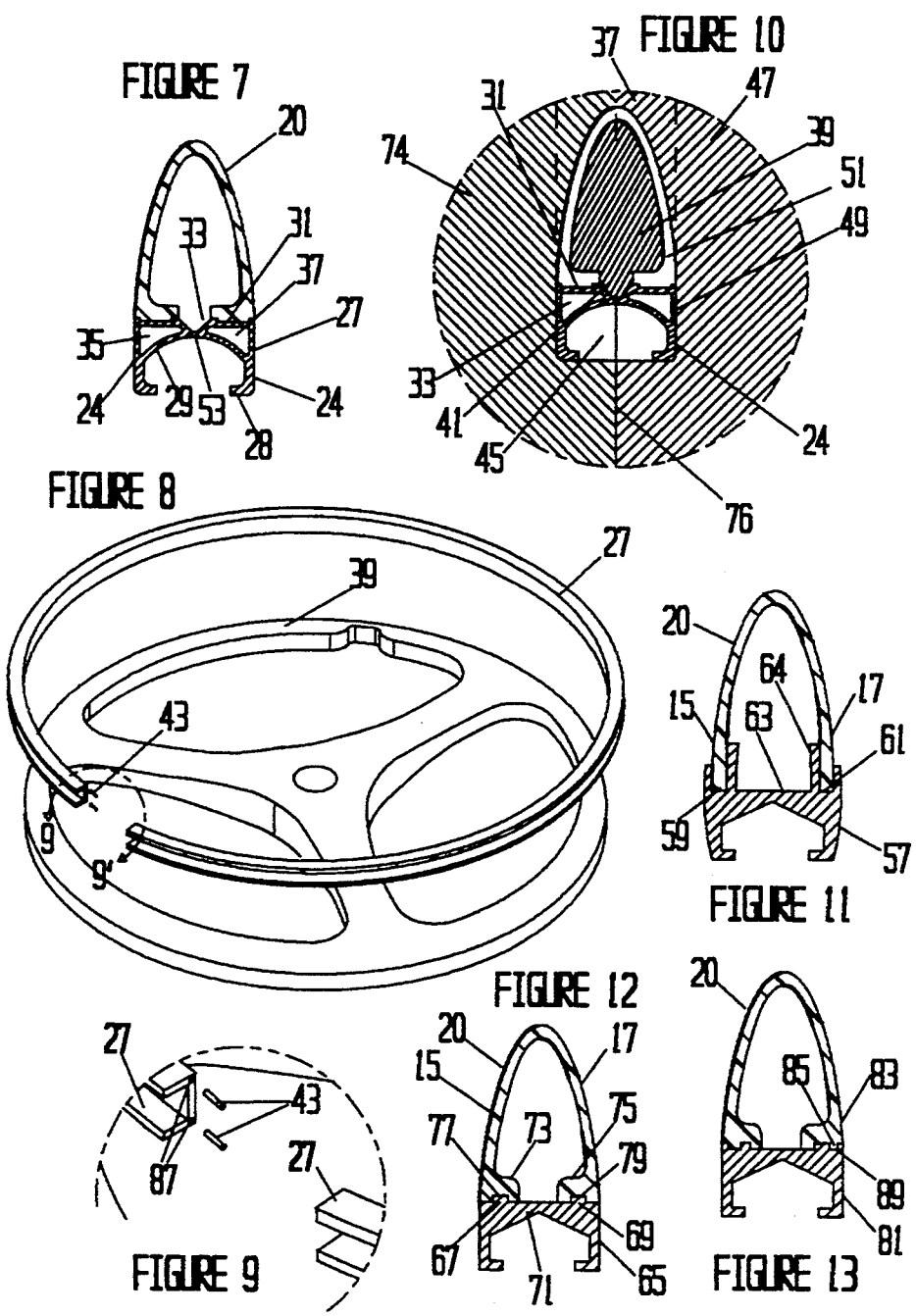

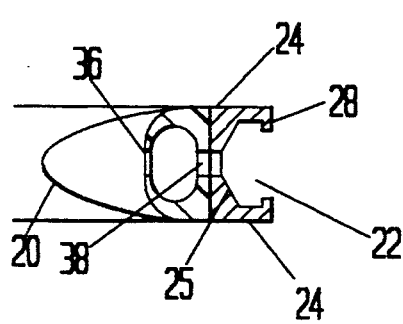
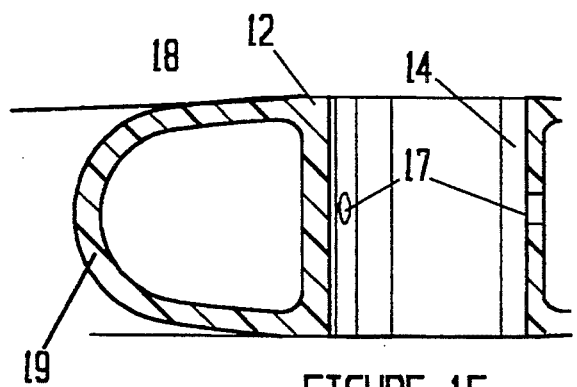
FIGURE 14  FIGURE 15
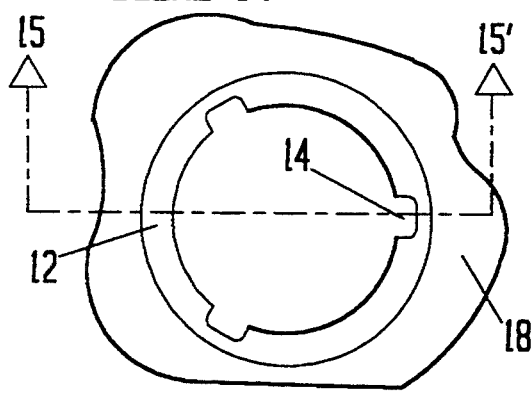
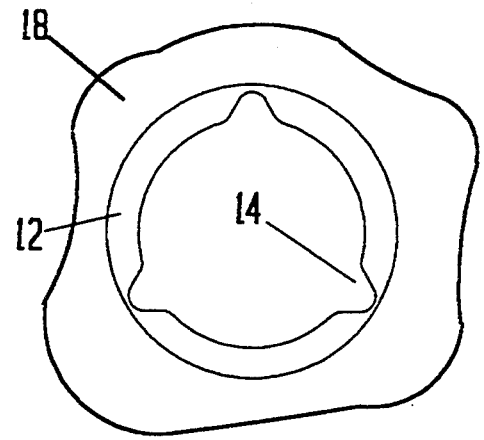
FIGURE 16  FIGURE 17
FIGURE 18
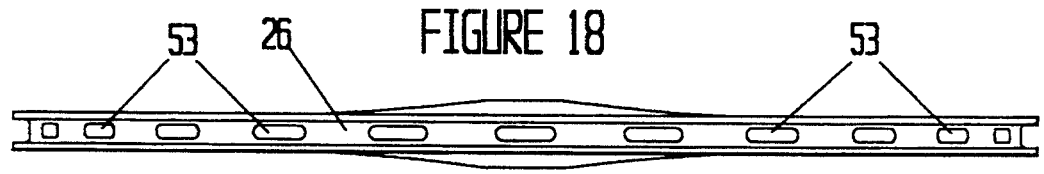

INJECTION MOLDED PLASTIC BICYCLE WHEEL

BACKGROUND OF THE INVENTION

1. Field of the Invention

This invention relates a molded plastic wheel and, in particular, to a hollow-form wheel with an independently formed rim for use on bicycles.

2. Brief Statement Of The Prior Art

Plastic wheels for bicycles and other applications have been provided by a variety of molding techniques. A large number of prior patents disclose wheels which are made by injection molding, but which are not hollow-form. Instead, these wheels have solid ribs or spokes which extend between a central hub and outer rim. Examples of such patents are U.S. Pat. Nos. 4,508,392 and 4,793,659. Other attempts to provide a molded plastic wheel suitable for use on bicycles are described in U.S. Pat. Nos. 3,862,779 and 4,818,034. In these patents a hollow-form wheel is assembled from split, mirror image halves and the assembly is retained by suitable fasteners or studs. While this approach can provide a hollow form wheel, it compromises the strength of the wheel and requires substantial manual assembly.

Another attempt to provide a plastic bicycle wheel is disclosed in U.S. Pat. No. 4,844,552. This patent describes a spokeless wheel having a solid center which is formed by an assembly of annular diaphragms between a central hub and outer rim.

Molded plastic bicycle wheels have been marketed with limited success. These wheels are three-spoke plastic wheels which are made by applying multiple layers of resin impregnated graphite fiber onto a plastic foam or rubber mandrel that is placed in a mold and heated to cure the resin. The plastic foam mandrel remains in the wheel. The rubber mandrel is extracted from the hub and annulus areas of the wheel and a separate rim and a separate hub are bonded to the wheel by secondary bonding.

These procedures are very tedious and rely substantially on custom hand fabrication, and do not provide the precision and accuracy that is desirable for consistent performance in quality of the wheel.

In our prior U.S. Pat. No. 5,184,874 we disclose a one-piece, hollow form, injection-molded bicycle wheel in which the rim is integrally formed with the wheel. This wheel combines the best in strength and weight and ease of manufacturing. In some instances, however, it is desirable to provide a wheel of fiber reinforced plastic construction which has a separately formed rim, thereby permitting use of different materials for the rim, e.g., a metal rim, or a reinforced plastic of different composition than that of the remainder of the wheel.

OBJECTIVES OF THE INVENTION

It is an objective of this invention to provide a molded, hollow-form spoked plastic wheel having an independently formed rim, for use as a bicycle wheel.

It is also an objective of this invention to provide the aforementioned bicycle wheel by injection molding.

It is a further objective of this invention to provide the aforementioned bicycle wheel with strength and resiliency equal to or greater than that of a conventional metal spoked wheel.

It is also a further objective of this invention to provide the aforementioned bicycle wheel by mass manufacturing techniques of injection molding.

It is an additional objective of this invention to provide the aforementioned bicycle wheel molded with a high accuracy and precision and that has uniform strength and balance.

Other and related objectives will be apparent from the following description of the invention.

BRIEF DESCRIPTION OF THE INVENTION

This invention comprises a hollow-form wheel formed by injection molding of plastic to which is bonded an independently formed rim. The wheel has an integral, central sleeve to receive a wheel hub assembly, at least three, hollow-form, integral spokes that are symmetrically located at equal angular spacings about the hub, and an integrally formed outer annulus which receives an independently formed rim suitable for mounting of a conventional tire. The rim can be molded of plastics which are different from those used for the wheel, or can be formed of metal. The rim can be bonded to the outer annulus of the wheel with secondary bonding, or the rim can be placed in the mold used to form the wheel and the annulus can be formed and bonded to the rim during injection molding of the wheel.

BRIEF DESCRIPTION OF THE FIGURES

The invention will be described with reference to the figures of which;

FIG. 1 is a side elevational view of the molded plastic wheel of the invention;

FIG. 2 is a sectional view along line 2-2' of FIG. 1;

FIG. 3 is an enlarged view of the area within line 3-3' of FIG. 2;

FIG. 4 is a sectional view along line 4-4' of FIG. 1;

FIG. 5 is a sectional view along line 5-5' of FIG. 1;

FIG. 6 is a sectional view along line 6-6' of FIG. 1;

FIG. 7 is a sectional view of the rim and wheel annulus of a preferred embodiment;

FIG. 8 illustrates assembly of the rim of the wheel to the mandrel for molding the wheel;

FIG. 9 is an enlarged view of the area within line 9-9' of FIG. 8;

FIG. 10 is a sectional view of the rim and annulus cavity of the injection mold, with the assembly of rim and mandrel in place;

FIG. 11 is a view of a rim and annulus which is an alternative embodiment to that shown in FIG. 3;

FIG. 12 is another alternative embodiment to that shown in FIG. 3;

FIG. 13 is another alternative embodiment to that shown in FIG. 3;

FIG. 14 is an enlarged sectional view along line 14-14' of FIG. 1;

FIG. 15 is an enlarged sectional view of the hub of the wheel;

FIG. 16 is an enlarged plan view of the hub of the wheel;

FIG. 17 is an enlarged plan view of the a hub which is alternative to that shown in FIG. 16; and FIG. 18 is an edge view of the molded wheel and joined rim of the invention.

DESCRIPTION OF THE PREFERRED EMBODIMENT

Referring now to FIG. 1, the molded bicycle wheel 10 of the invention is shown as having a central sleeve 12 that, preferably, has a plurality of axial grooves 14 (see FIG. 13) to receive a conventional bearing hub assembly (not shown). The sleeve 12 is integrally formed with the remainder of the wheel which comprises a plurality of spokes 16, preferably three, which extend radially outwardly from a hub 18 to an annulus 20. An annular rim 21 is bonded to the outer annulus 20 and has sidewalls 24 to receive a conventional tire. A greater number of spokes can be provided, if desired, for optimum balance of strength and stiffness with minimum weight.

As apparent from the sectional views of FIGS. 4, 5 and 6, the spokes 16 are ellipsoidal in shape, preferably with an elongated ellipsoidal contour as apparent in the sectional views. As shown in FIG. 2, the spokes taper from a minimum thickness at the annulus 20 to the hub 18, which is of greater thickness. In the illustrated embodiment, the spokes have a tapered thickness for approximately ⅔ their length along a curvilinear arc, following a large diameter radius of curvature. Straight tapers over greater or slightly lesser lengths can be provided, if desired provided that the spokes taper smoothly in thickness from the hub 18 to the annulus 21 over a major portion of their length. The tapered thickness of the spokes increases the strength and lateral stiffness of the wheel, and provides an appearance of a more substantial construction then has a wheel of the uniform thickness. As an illustration, a wheel having spokes of tapered thickness, as shown in FIG. 2, has 30 to 40 percent greater lateral stiffness than a wheel having spokes of uniform thickness. Further, the two wheels are substantially the same weight, as the tapering of the spokes, as illustrated, adds less than one percent to the weight of the wheel.

As shown in FIG. 1, the spokes 16 and the annulus 20 are joined with fillets 19 having smooth radii. The spokes are formed with edges 30 and 32 which have radii of curvature at centers that are located outside the circumference of the rim. This shape maximizes the aerodynamic and strength properties of the wheel.

The wheel is injection molded of thermoplastic resins, e.g., Nylon, polyphenylene sulfide, polyether imide, polyesters, polyurethane, etc., or of thermoset resins, e.g., epoxy resins. The resins are reinforced with long chopped fibers, such as fiberglass or, preferably graphite fibers, which are added in amounts from 10 to about 60 weight percent. The fibers which are very useful have lengths from about 0.1 to about 0.75 inch. The preferred resin for most applications is Nylon reinforced with graphite fibers at a concentration about 25 weight percent.

The sectional views of FIGS. 3-6 are enlarged for greater clarity, and the thicknesses of the sidewalls is increased for illustration purposes. As apparent from a comparison of the figures, the minor axis of each section increases from FIG. 4 to FIG. 5. Thus, the minor axis 4 of the elliptical section shown in FIG. 4 is less than minor axis 5 of FIG. 5, which is less than the minor axis 6 of FIG. 6. Preferably, spokes 16 have a ratio of width to thickness greater than 1.0 throughout their entire length. The wall thickness of the wheel is sufficient to provide a performance which is equal or greater than that of a conventional steel-spoke bicycle wheel. With the preferred plastic a wall thickness from 0.075 to 0.125 inch, preferably about 0.09 inch, provides the necessary stiffness, strength and flexibility to equal or exceed the performance of a conventional steel-spoked bicycle wheel.

Referring now to FIG. 3, the annulus 20 has a streamlined shape with a hemi-ellipsoidal contour. The annulus 20 of the wheel is entirely enclosed, with a wide base wall 26 that provides a surface for bonding to the base wall 25 of the rim 21. The rim 21 is in the shape of an annular channel which, preferably has parallel sidewalls 24 which support coextensive inwardly directed annular lips 28, thereby forming a conventional rim to receive a conventional bicycle tire. The rim can be formed of metal, e.g., aluminum, magnesium, or their alloys, stainless steel, or chrome plated mild steel and is bonded to the base wall 26 of the annulus The bonding can be secondary bonding with a suitable permanent adhesive or resin. Alternatively, the rim 21 can be inserted into the mold cavity in the manner described with reference to FIGS. 8-10, and the rim is then bonded to the base wall 26 of the annulus during its formation in the injection molding of the wheel.

Preferred shapes of the annulus and rim are shown in FIG. 7. In this embodiment, the rim 27 has side walls 24 with inwardly directed lips 28, as previously described. The rim also has a concave inner wall 29 and a flat bottom wall 31. The undersurface of the bottom wall 31 is preferably knurled to provide a roughened surface to enhance bonding to the molded plastic wheel. The bottom wall of the rim has a triangular channel 33 which is centered in the middle of the rim 27, dividing the hollow interior of the rim into two annular chambers 35 and 37, located at each side of the rim. The rim 27 is formed by conventional extrusion fabrication as a straight extrusion which is rolled to the proper diameter. To complete the rim, its ends are joined and the joint is secured in a conventional manner such as bonding with adhesives, welding, or with suitable fasteners, e.g., pins or rivets.

As shown in FIG. 8, the rim 27 is the form of a rolled extrusion is snapped over the eutectic metal mandrel 39 used for the injection molding of the wheel. The mandrel is simplified for illustration purposes and appears to have square shoulders. In practice, the cross sections of the annulus, the spokes and hub are the elliptical and hemi-elliptical as shown by the interiors of the wheel cross sections which appear in FIGS. 3-6 and 15. The mandrel 39 has a raised peripheral rim 41 along its midline, and rim 41 has a triangular cross section conforming to the triangular channel 33 in rim 27, thereby centering the rim on the mandrel. The rib 41 on the outer periphery of the mandrel 39 is not shown in FIG. 8, however, it appears in the cross-sectional view of the mandrel in FIG. 10.

Referring now to FIG. 9, the pins 43 and bores 87 which receive the pins are shown in an enlarged view. After the rim 27 is placed over the mandrel 39, the rim fasteners, pins 43 are inserted in bores 87 and secured by adhesives or welding to form a rim which is locked to the mandrel 39.

FIG. 10 is a sectional view of the rim and annulus cavity 45 of the injection mold 47 used to form the wheel. A two-piece mold is used with mold halves 47 and 74 which engage at parting plane 76. The assembly of the mandrel 39 and rim 27 are shown in place in the mold cavity 45, prior to injection molding. The assembly of the rim and mandrel is centered in the cavity by the side walls 49 of the cavity which receive the side walls 24 of the rim. The knurled bottom wall 31 of the rim 27 completes the cavity 51 for forming of the wheel annulus 20. Since the rim 27 is centered on the mandrel 39, the rim thereby centers and supports the mandrel 39 by its outer edges in the mold cavity during injection molding of the wheel about the mandrel.

After its formation, the wheel is heated to melt the mandrel, and apertures 53 in the inner wall 29 (see FIGS. 8 and 18) of the rim 27 provide drainage for the molten mandrel.

Alternative constructions can be used for attachment of a independently formed rim to the outer annulus 20. In the embodiment shown in FIG. 11, the rim 57 has a pair of grooves 59 and 61 in its base wall 63, and each of the outer walls 15 and 17 of the annulus 20 are received in grooves 59 and 61 to interlock the rim to the wheel. The rim has a slightly wider profile than the annulus with internal flanges 64 that extend into the annulus to provide an expanded area for bonding between the rim and wheel.

FIG. 12 illustrates another embodiment in which the rim 65 has a pair of ribs 67 and 69 on its base wall 71. The annulus 20 has inwardly formed lips 73 and 75 on its side walls 15 and 17 with annular grooves 77 and 79 which receive the ribs 67 and 69. In applications in which the rim is placed within the molding cavity used in the injection molding of the wheel, the grooves and lips can be dovetailed if desired for enhancing the strength of the joint. When the rim and wheel are separately formed, the rim can be bonded to the annulus with a permanent adhesive between the base wall 71 and lips 73 and 75.

Another embodiment is shown in FIG. 13, in which the rim 81 has its side walls extended a slight distance to form grooves 89 along its opposite sides. The side walls 83 of the annulus are formed with interlocking shoulders 85 within the grooves 89. As with the previously discussed embodiments, the rim can be centered on the mandrel and the wheel bonded to the rim during molding, or rim can be bonded to the wheel by adhesives, etc. after molding the wheel.

The use of an independently formed rim permits selection of a different material for the rim. The rim can be formed of steel, aluminum, or magnesium or their alloys. Alternatively, the rim can be formed of a resin and/or reinforcing fiber different from that used for the wheel. Thus, the wheel can be molded of epoxy resins, polyamide, polyethylene terephthlate, polyphenylene sulfide, etc., and can be reinforced with continuous fibers of carbon, graphite or fiberglass. In special applications in which the weight is minimized, the rims can be formed of fiber reinforced plastics using hand lay up methods to achieve highly oriented fibers. These rims can then be secondarily bonded to the wheel, or can be placed in the mold, in the same manner as described with regard to FIGS. 8-10.

The wheel also has provision for the inflation stem of a conventional type, and FIG. 14 is an enlarged sectional view through the wheel and annulus at the inflation stem area. To accommodate standard length valve stems, the annulus has a necked section of reduced major width which provides clearance for a conventional air delivery nozzle. As there illustrated, the through aperture 36 is aligned with a second through aperture 38 that extends transversely through the base wall 26 of the annulus and base wall 25 of the rim 21, thereby providing for passage or insertion of the conventional inflation stem of a balloon tire.

Referring now to FIG. 15, the shape of the central hub area 18 will be apparent. The central sleeve 12 of the hub is shown in plan views in FIGS. 16 and 17. As illustrated in FIG. 15, the central hub area 18 has an outer edge 19 that is hemi-elliptical in shape and is also of hollow form. The hub area 18 has a centrally located, integrally formed sleeve 12 which has a plurality of apertures 17 which communicate with the interior of each of the spokes 16. These apertures permitting draining of the molten eutectic metal mandrel after molding of the wheel and permit support of the mandrel in the mold cavity.

The sleeve 12 has a plurality of axial slots 14 on its inside wall; see also FIGS. 16 and 17. The slots 14 receive axial ribs which are located on the outer cylindrical casing of the standard metal hub and bearing assembly which fits into the integral plastic sleeve 12 of the wheel 10.

In FIG. 17, the integral plastic hub 12 is shown with a plurality of lobed-shaped cavities 14a which receive lobes that are located on the outer wall of the casing of a standard metal hub and bearing assembly. As shown in FIG. 17, the lobes or slots extend along the inside wall of the hub 12.

Referring now to FIG. 18, the base wall 26 of the annular peripheral rim 24 of the tire is formed with a plurality of apertures 53 that are spaced apart at equal angular increment about the periphery of the wheel. The shape of the apertures is not critical; circular holes, or elongated slots as shown in FIG. 18, can be used. The apertures minimize wheel weight without significantly comprising the rigidity and strength of the wheel. Also, these apertures permit draining of the molten metal formed when the metal mandrel is melted, as described hereinafter.

The wheel of the invention is formed by injection molding. The hollow form structure of the wheel is achieved with injection molding of a resin about a preformed mandrel. The mandrel should be liquefiable, i.e, be capable of a change in state from solid to liquid, and in the solid state should be stable to the molding conditions of temperature and pressure. It should also be capable of the change in physical state from solid to liquid under conditions which do not affect the molded products.

One method is to use a mandrel which is formed of a eutectic metal having a melt point which is slightly below the melt temperature of the thermoplastic polymer. Commercially available eutectic metals for this purpose are available from Electrovert, 655 Main St., East Greenwich, R.I. The mandrel is formed with very close tolerances to the interior dimensions of the injection mold cavity so that the hollow form wheel that is produced will have uniform wall thickness throughout, with the thickness as previously mentioned.

Another method is to use a mandrel which will dissolve in a solvent that is innocuous to the molded product, e.g., a mandrel formed of a water soluble polymer such as polyvinyl alcohol or acrylic copolymers, which can include a mineral filler for dimensional stability under the injection molding conditions.

The injection molding is conventional in procedure. The polymer is injected at a temperature above its melt point and flows into the mold cavity about the mandrel. The temperature of the mold is controlled in a conventional manner to obtain solidification of the polymer, which is ejected from the mold, still containing the metal mandrel. A typical cycle time for the injection molding is from 40 to about 75 seconds for thermoplastic resins, and from 2 to about 6 minutes for thermosetting resins.

The molded wheel and eutectic metal mandrel are then placed in an oil bath which is maintained at the melt temperature of the eutectic metal used for the mandrel. The oil bath heats the metal, melting it and the molten metal drains from the finished wheel through the apertures 53 located about the annular rim 21 of the wheel and from the apertures 17 in the hub sleeve 12, with the result that an entirely integral molded plastic wheel is obtained having a very uniform wall thickness, weight and strength.

The same procedure is followed with the soluble mandrel. The molded wheel and water-soluble mandrel are placed in a water bath which can be heated to a moderate temperature, e.g., from 100 to 200 degrees F. to hasten the rate of dissolution of the mandrel. The wheel is then removed, drained, rinsed and dried to obtain the finished product as a one-piece, hollow-form wheel.

Significantly, the wheel is formed with a high degree of balance, requiring little work to provide complete balance of wheel. The molten eutectic metal accumulates as a settled layer within the oil bath from where it can be drained for reuse in fabrication of the mandrels.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A hollow-form wheel having a central hub with hollow form spokes and integrally formed peripheral annulus which is formed entirely by injection molding of a fiber-reinforced plastic, and an annular rim joined to said annulus.

2. The wheel of claim 1 having at least three, hollow-form spokes having a width to thickness ratio greater than unity, integral with said hub and rim and symmetrically located thereabout at equal angular spacings.

3. The wheel of claim 2 wherein said spokes have ellipsoidal cross sections.

4. The wheel of claim 2 wherein said annular rim has means to index its midline plane to a mandrel used for molding of the wheel.

5. The wheel of claim 4 wherein said index means comprises a channel in the base wall of said rim which lines on the midline plane of said rim.

6. The wheel of claim 5 wherein said channel has a triangular cross section.

7. The wheel of claim 1 wherein said central hub includes a central sleeve having an inside diameter for receiving a wheel hub assembly including wheel bearings.

8. The wheel of claim 7 including a plurality of axial slots on the inside wall of said sleeve to receive indexing ribs of a wheel hub assembly.

9. A hollow-form bicycle wheel having a central hub of a first thickness, an integrally formed peripheral annulus of a second, lesser thickness, and hollow form integrally formed spokes which taper in thickness from said first to said second thickness along a major portion of their length, with said wheel being formed entirely by injection molding of a fiber-reinforced plastic.

10. The bicycle wheel of claim 9 having at least three, hollow-form spokes having a width to thickness ratio greater than unity, integral with said hub and annulus and symmetrically located thereabout at equal angular spacings.

11. The bicycle wheel of claim 10 wherein said spokes have ellipsoidal cross sections.

* * * * *